US012243659B2

(12) United States Patent
Benecke et al.

(10) Patent No.: US 12,243,659 B2
(45) Date of Patent: Mar. 4, 2025

(54) HYDROGENATION SYSTEM FOR A PRESSURIZED WATER REACTOR

(71) Applicant: FRAMATOME GmbH, Erlangen (DE)

(72) Inventors: Martin Benecke, Niedergörsdorf (DE); Marco Bewer, Oesdorf (DE); Jörg Niedermeyer, Wassertrüdingen (DE)

(73) Assignee: FRAMATOME GmbH, Erlangen (DE)

( * ) Notice: Subject to any disclaimer, the term of this patent is extended or adjusted under 35 U.S.C. 154(b) by 454 days.

(21) Appl. No.: 17/617,292

(22) PCT Filed: Jul. 3, 2019

(86) PCT No.: PCT/EP2019/067839
§ 371 (c)(1),
(2) Date: Dec. 7, 2021

(87) PCT Pub. No.: WO2021/001036
PCT Pub. Date: Jan. 7, 2021

(65) Prior Publication Data

US 2022/0254530 A1 Aug. 11, 2022

(51) Int. Cl.
*G21C 17/022* (2006.01)
*G21C 19/28* (2006.01)
(Continued)

(52) U.S. Cl.
CPC ........... *G21C 17/022* (2013.01); *G21C 19/28* (2013.01); *G21D 1/04* (2013.01); *G21C 17/0225* (2013.01);
(Continued)

(58) Field of Classification Search
CPC .. G21C 17/022; G21C 19/28; G21C 17/0225; G21C 17/032; G21D 1/04
(Continued)

(56) References Cited

U.S. PATENT DOCUMENTS 3,721,116 A 3/1973 Brachat et al.
4,282,062 A 8/1981 Stiefel et al.
(Continued)

FOREIGN PATENT DOCUMENTS

BE 758890 A 4/1971
CN 1196819 A 10/1998
(Continued)

OTHER PUBLICATIONS

Corresponding Search Report and Written Opinion for PCT/EP2019/067839.

*Primary Examiner* — Jack W Keith
*Assistant Examiner* — Daniel Wasil
(74) *Attorney, Agent, or Firm* — Davidson Kappel LLC

(57) ABSTRACT

A pressurized water reactor includes a primary reactor coolant circuit flown through by a primary reactor coolant during operation, and a chemical and volume control system for the primary reactor coolant. The chemical and volume control system includes, along the direction of flow of the primary reactor coolant, a letdown line, a high-pressure charging pump with a given discharge pressure, and a charging line leading to the primary reactor coolant circuit. The chemical and volume control system further includes a hydrogenation system with a hydrogen supply and a hydrogen feeding line. In order to achieve efficient and fast hydrogen injection into the primary reactor coolant, a high-pressure feeding pump is arranged in the feeding line to provide a gas pressure higher than the discharge pressure of the charging pump. The feeding line discharges into the charging line.

8 Claims, 4 Drawing Sheets

(51) Int. Cl.

| | |
|---|---|
| ***G21D 1/04*** | (2006.01) |
| *G21C 17/028* | (2006.01) |
| *G21C 17/032* | (2006.01) |
| *G21D 3/10* | (2006.01) |

(52) U.S. Cl.
CPC ......... *G21C 17/028* (2013.01); *G21C 17/032* (2013.01); *G21D 3/10* (2013.01)

(58) Field of Classification Search
USPC .......................................................... 376/306
See application file for complete search history.

(56) References Cited

U.S. PATENT DOCUMENTS

| | | | |
|---|---|---|---|
| 5,149,493 | A | 9/1992 | Latge |
| 5,201,229 | A * | 4/1993 | Ibe ....................... G01N 27/205 73/776 |
| 5,398,269 | A | 3/1995 | Nagase et al. |
| 5,625,656 | A | 4/1997 | Hettiarachchi et al. |
| 6,968,028 | B1 | 11/2005 | Puthawala |
| 2004/0057549 | A1 * | 3/2004 | Wada ................. G21C 17/0225 376/308 |
| 2012/0263269 | A1 * | 10/2012 | Yamamoto ............. G21C 19/28 376/306 |
| 2012/0294404 | A1 | 11/2012 | Wada et al. |
| 2014/0177777 | A1 | 6/2014 | Whittaker et al. |
| 2016/0372219 | A1 | 12/2016 | Okamura et al. |

FOREIGN PATENT DOCUMENTS

| | | | |
|---|---|---|---|
| CN | 102588742 | A | 7/2012 |
| CN | 104299666 | A | 1/2015 |
| CN | 206194383 | U | 5/2017 |
| CN | 106847349 | A | 6/2017 |
| CN | 107481773 | A | 12/2017 |
| EP | 0394129 | A1 | 10/1990 |
| EP | 0426453 | A2 | 5/1991 |
| EP | 0852800 | B1 | 12/1999 |
| EP | 2896721 | A1 | 7/2015 |
| JP | 1981090297 | A | 7/1981 |
| JP | H01223396 | A | 9/1989 |
| JP | H05264786 | A | 10/1993 |
| JP | H1090485 | A | 4/1998 |
| JP | 2000075079 | A | 3/2000 |
| JP | 3388579 | B2 | 3/2002 |
| JP | 2002507731 | A | 3/2002 |
| JP | 2006250723 | A | 9/2006 |
| KR | 1019990063905 | | 7/1999 |
| RU | 137152 | U1 | 1/2014 |
| WO | WO199713253 | A1 | 4/1997 |
| WO | WO1999948106 | A1 | 9/1999 |
| WO | WO2004012205 | A1 | 2/2004 |
| WO | 2005207936 | A | 8/2005 |
| WO | WO2007030740 | A2 | 3/2007 |

* cited by examiner

HYDROGENATION SYSTEM FOR A PRESSURIZED WATER REACTOR

The present disclosure relates to a pressurized water reactor comprising a primary reactor coolant circuit, an associated chemical and volume control system, and an according hydrogenation system. The present disclosure also relates to a related method of operating a pressurized water reactor.

BACKGROUND

A pressurized water reactor comprises a primary reactor coolant circuit inside which a primary reactor coolant circulates under high pressure. A Chemical and Volume Control System (CVCS) is fluidically connected to the primary reactor coolant circuit. The CVCS comprises a low-pressure part which usually provides a point of entry or injection for various fluids into the primary reactor coolant. In particular, it may be required to inject hydrogen into the primary reactor coolant, e.g. to bond dissolved oxygen.

Prior art document EP 0 852 800 B1 discloses a pressurized water reactor. In the disclosed system, a hydrogen feed line discharges into the low-pressure part of the CVCS upstream of the high-pressure charging pump (i.e. on its suction side), hence realizing a low-pressure injection of hydrogen (typical operating pressure: 3 bara).

Apart from that, there are wet-chemistry systems for injection of hydrazine or hydrogen peroxide into low-pressure lines.

SUMMARY

Drawbacks of these approaches are usually related to a limitation of the hydrogen feed rate. The injection process is temporarily inert, and its effects are time delayed. Furthermore, wet chemistry solutions may be toxic, cancerous, corrosive, and/or generally harmful to the environment and the operating personnel and do not provide free hydrogen.

Therefore, an objective underlying the present disclosure is to provide a pressurized water reactor with a hydrogenation system and an according method of operation which are suited for efficient and fast hydrogen injection into the primary reactor coolant. The device and the according process shall be reliable and robust with respect to perturbations. A modular and space-saving construction is desirable.

Hence, a key feature is that a high-pressure feeding pump is arranged in the hydrogen gas feeding line to provide a feeding pressure higher than the discharge (or: outlet) pressure of the charging pump for the primary reactor coolant, and that the feeding line discharges into the charging line, i.e. at a point of injection downstream the charging pump.

The proposed technical modification of the common approach is the creation of an active high-pressure injection instead of a passive injection in a low-pressure part of the system.

This design is based on the needs to have a hydrogen injection that is able to provide a precise defined amount of hydrogen in a defined time. In current designs there is a variation of amounts of gaseous hydrogen either in the Volume Control Tank (VCT) or the gas separator based on the plant design. In both cases the maximum operating pressure of the related system parts is varying from 1 to 4 bara (higher in case of transients). For the high-pressure hydrogen injection according to the present disclosure, the injection point is downstream of the high-pressure charging pumps. The advantage in terms of physics for the injection of hydrogen is diffusion with a specific pressure in a specific time via a specific surface while the pressure is approx. 40 times higher than for the low-pressure injection.

Instead of passive mechanisms (for example the injection in the hydrogenation station or the spray lance in the VCT) a piston compressor shall preferably be used to raise the gas pressure in the pipe to ensure the injection downstream the high-pressure charging pumps.

The regulation of the piston compressor outlet pressure shall be limited by the operating conditions in the charging line. By this design the diffusion process is largely increased in speed due to the high pressure. Gas bubbles will be injected directly into the charging flow, where the solubility of hydrogen is ~50 times higher than in the low-pressure part of the system. This makes the process of hydrogenation also more easily controllable (i.e. waiting time for an effect of the regulation is shorter).

Another benefit of the design is that nitrogen pollution will not occur as much as it is the case on the low-pressure injection via the hydrogenation station (with VCT connected and flushed with nitrogen). This limits the creation of C14 in the core thus limiting the amount of radioactive deposits.

In terms of time and cost, an important point is the decrease of the time spent during start up waiting for the hydrogen concentration to raise in order to reach 100% power conditions.

The design can also easily be doubled (redundancy) on any point in order to guarantee a high availability.

In summary, the present disclosure uses a-high pressure feeding pump, preferably a piston compressor or a membrane compressor, to inject hydrogen at any suitable position of the CVCS downstream the charging pump (which can be of any suitable type). The concept may also be summarized as a backpressure independent hydrogenation of primary reactor coolant due to the general lower pressure of the primary reactor coolant circuit compared to the discharge pressure of the feeding pump and charging pump.

To recap, the now proposed high-pressure injection with an injection point downstream of the charging pump (typical discharge pressure: 185 bar) provides, among others, the following advantages:

- besides piping there are no cavities containing gaseous hydrogen
- hence smaller explosion risks due to better leak detection/prevention
- hydrogen control with shorter response times
- higher possible and more stable hydrogen concentrations within the primary reactor coolant circuit due to robustness against disturbances
- inertization of the VCT within the CVCS with nitrogen is no longer necessary
- modular construction Drawbacks are the need for a high-pressure feeding pump in the gas feeding line and the high hydrogen pressure prevailing in the feeding line.

In a preferred embodiment an isolation valve is arranged in a section of the feeding line between the feeding pump and the point of injection into the charging line.

Preferably, the gas feeding line comprises a double walled pipe with an evacuated interspace between an inner wall and an outer wall, wherein a leakage detection system is designed to monitor pressure within the interspace, and preferably to isolate a leaking line section.

In another advantageous embodiment, the hydrogenation system comprises a control system with a hydrogen sensor which measures the hydrogen contents of the primary reactor coolant in the charging line downstream the point of injection, wherein the control system is designed to close the isolation valve when said measured hydrogen contents does not match the set hydrogen feed rate of the hydrogenation system.

In yet another advantageous embodiment, the hydrogenation system comprises a control system with a hydrogen sensor which measures the hydrogen contents of the primary reactor coolant in the letdown line, wherein the control system is designed for controlling the hydrogen feed rate by setting the power of the feeding pump on the basis of a difference between said measured hydrogen contents and a given setpoint for said hydrogen contents.

BRIEF SUMMARY OF THE DRAWINGS

Exemplary embodiments of the present disclosure are subsequently discussed with reference to the accompanying drawings.

DETAILED DESCRIPTION

Figure 1:
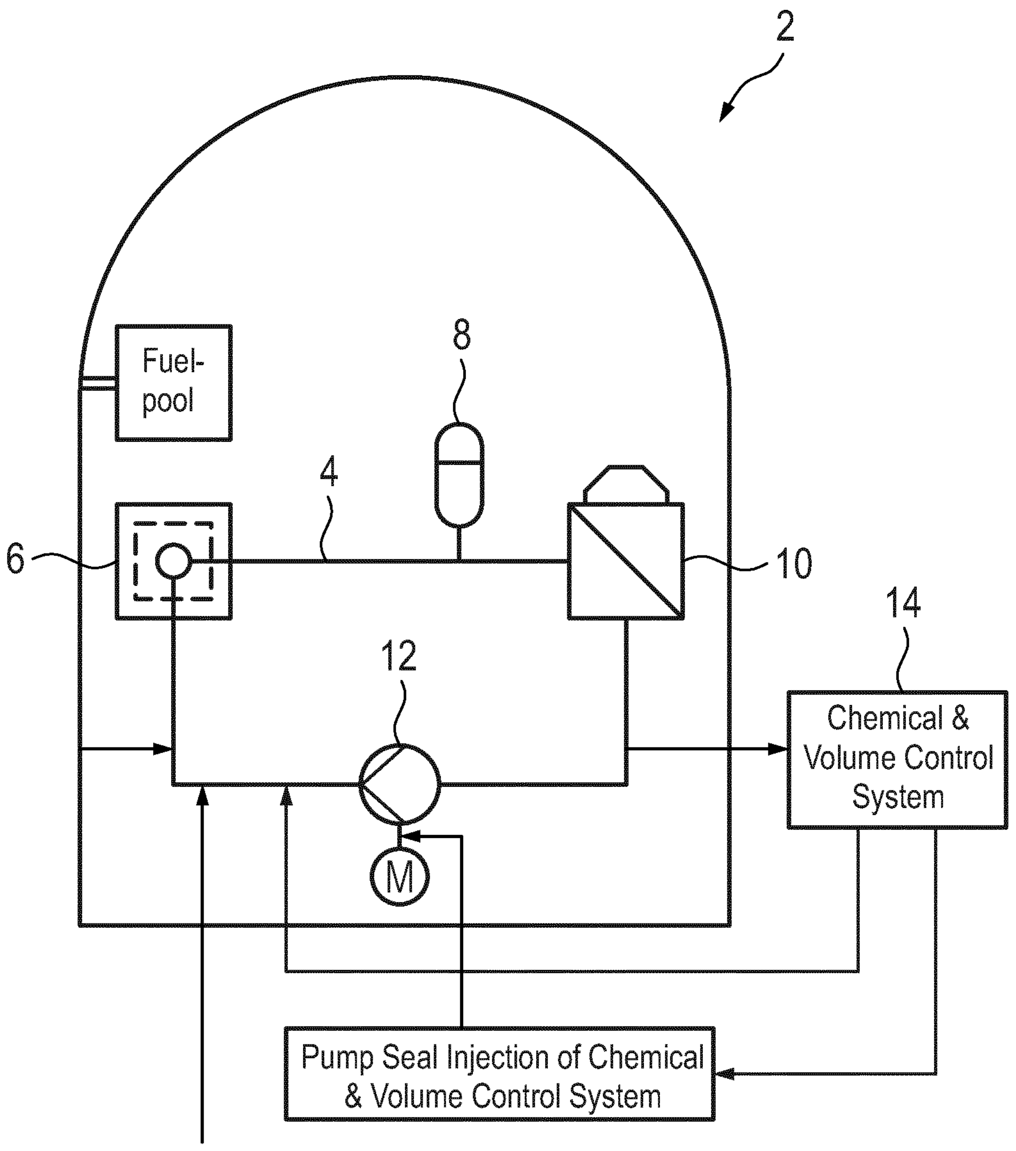
FIG. 1 provides a schematic overview of a pressurized water reactor.

According to FIG. 1, a Pressurized Water Reactor (PWR) 2 comprises a primary reactor coolant circuit 4 carrying a primary reactor coolant. The primary reactor coolant circuit 4 comprises a Reactor Pressure Vessel (RPV) 6, a pressurizer 8, a steam generator 10, and a Reactor Coolant Pump (RCP) 12. The steam generator 10 provides a thermal connection to a secondary reactor coolant circuit. The volume, the chemical composition, and other physical properties of the circulating primary reactor coolant can be controlled by a Reactor Chemical and Volume control system (CVCS) 14 which is fluidically connected to the primary reactor coolant circuit 4. This is shown schematically in FIG. 1.

Figure 2:
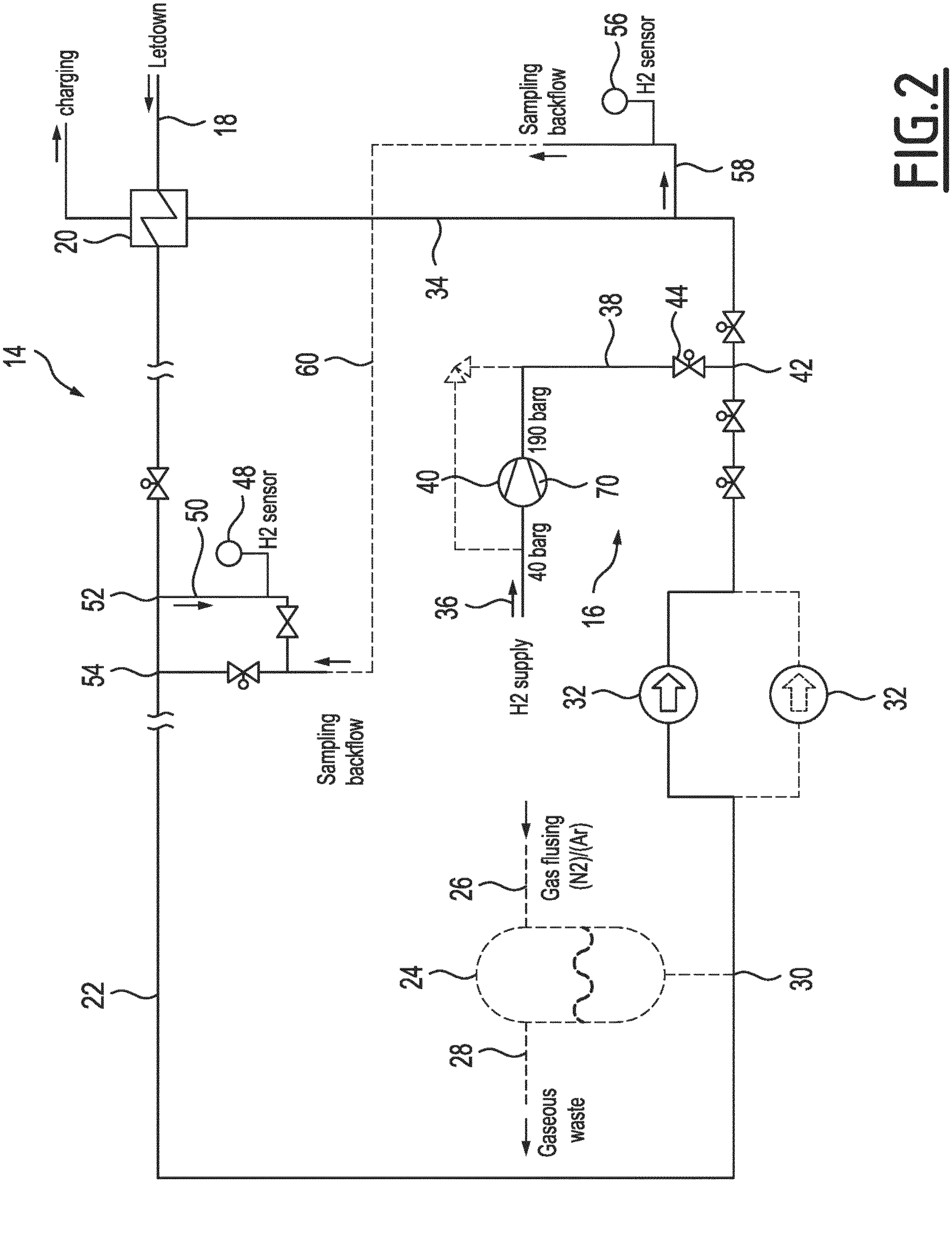
FIG. 2 shows a schematic piping and instrumentation diagram of a hydrogenation system coupled to a chemical and volume control system of a pressurized water reactor.

FIG. 2 shows a simplified Piping and Instrumentation Diagram (P&ID) of a hydrogenation system 16 coupled to a CVCS 14 of a PWR 2 in a Nuclear Power Plant (NPP). As explained above, the CVCS 14 is fluidically coupled to a primary reactor coolant circuit 4 of the PWR 2 in order to continuously extract a stream of primary reactor coolant from the primary reactor coolant circuit 4, to treat it chemically and/or physically, and to re-charge it into the primary reactor coolant circuit 4 after said treatment. The treatment is usually accomplished at a low pressure (e.g. 4 barg) compared to the high pressure in the primary reactor coolant circuit 4 (e.g. 185 barg) during operation.

A letdown line 18, in short letdown, carries a stream of low-pressure primary reactor coolant after pressure reduction by a pressure reducer (not shown here). A heat exchanger 20, flown through by a cooling medium (see next paragraph), is arranged in the letdown line 18 in order to remove heat from the stream of primary reactor coolant. Downstream the heat exchanger 20 the low-pressure, low temperature primary reactor coolant is led through a main line 22 of the CVCS 14 and may be subjected to chemical and/or physical treatment. The main line 22 may be regarded as a downstream section of the letdown line 18. For example, a boric acid supply line and/or a demineralized water supply line (not shown here) may be connected to the main line 22 in order to inject boric acid and/or demineralized water into the stream of primary reactor coolant, if required. Furthermore, there is a Volume Control Tank (VCT) 24 fluidically connected to the main line 22 of the CVCS 14, intended to act as a compensation reservoir. Furthermore, there may be a fluid discharge line 28 attached to the VCT 24, for example to facilitate removal of gaseous waste or generally for the purpose of degasification.

Downstream the tee connection 30 to the VCT 24 there is a high-pressure charging pump 32 switched into the main line 22 to bring the pressure of the flowing primary reactor coolant back to the level associated with the primary reactor coolant circuit 4 (e.g. 185 barg) and to re-inject or charge it into said circuit or loop via the subsequent charging line 34. More precisely, in the shown example there are two high-pressure charging pumps 32 in parallel-flow configuration for reasons of redundancy. Furthermore, there is a heat exchanger 20, flown through by a heating medium, arranged in the charging line 34 to increase the temperature of the primary reactor coolant before injection into the primary reactor coolant circuit 4. Advantageously, the hot incoming primary reactor coolant running through the letdown line 18 acts as the heating medium, such that recuperative heating and cooling is achieved.

To facilitate injection of hydrogen ($H_2$) into the primary reactor coolant running through the CVCS 14, there is a hydrogenation system 16 fluidically connected to the CVCS 14. According to the present disclosure, the hydrogenation system 16 is designed for high-pressure hydrogen injection into the high-pressure stream of primary reactor coolant running through the charging line 34. To this end, there is a hydrogen supply 36 or hydrogen source, in particular an electrolytic cell or a hydrogen cylinder providing hydrogen at low or medium pressure, for example 40 barg. A hydrogen (gas) feeding line 38 leads from the hydrogen supply 36 to the charging line 34, the injection point being downstream the charging pump(s) 32. A high-pressure feeding pump 40 is arranged in the feeding line 38 to provide a feeding pressure insignificantly higher than the discharge pressure of the charging pump(s) 32, and thus higher than the pressure prevailing in the charging line 34.

In a preferred embodiment there is an optional overflow line bypassing the feeding pump 40 and preferably leading into an exhaust system in case the isolation valve 44 is a solenoid valve and the membrane compressor of the feeding pump 40 needs some time for the runout in order not to pressurize the gas feeding line 38 more than necessary and/or not to induce unnecessary pressure transients on the feeding pump 40.

The connection between the feeding line 38 and the charging line 34, preferably a simple tee connection 42 or a nozzle, is preferably located in a section of the charging line 34 between the charging pump(s) 32 and the heat exchanger 20. An isolation valve 44, arranged in the feeding line 38 between the feeding pump 40 and the tee connection 42, allows for closing the feeding line 38 regardless of the state of the feeding pump 40, thereby decoupling the hydrogenation system 16 from the CVCS 14 and shutting down the hydrogen stream into the charging line 34, if desired or required.

The feeding pump 40 is preferably a piston compressor or a membrane compressor, in short compressor 70, preferably with adjustable motor speed. This means that the pumping power and hence the hydrogen feed rate are adjustable. The hydrogen feed rate is controlled via the pumping power by an according control system 46 (see FIG. 3 and the description further below). Alternatively, based on the compressor technology, a solution comprising of a control valve in the feeding line 38 and additional instrumentation can be foreseen for the control. The control system 46 also controls or sets the isolation valve 44. Therefore, the feeding pump 40 and the isolation valve 44 can be considered as actors of the hydrogenation system 16. A suitable control scheme will be described in more detail further below.

Preferably, the connection from low pressure hydrogen distribution to the feeding pump 40 will be done nearby the tee connection 42 to the charging line 34 in order to shorten the pipe length of high-pressure piping. The connection is preferably foreseen to be located outside the reactor building in order to ensure the possibility for maintenance and to lower the qualification needs. In existing systems, there are no additional changes on the charging line 34 necessary except the tee connection 42 to connect the gas feeding line 38.

Standstill times can be decreased by a second (redundant) compressor allowing maintenance on the second injection train during full power operation of the plant. While the VCT 24 could easily be used with any atmosphere by now, it could also be used for degasification means, without impacting the hydrogenation.

Sensory input to the control system 46 is provided by a number of hydrogen concentration sensors, in short hydrogen sensors or H2 sensors.

A first hydrogen sensor 48 is arranged for measuring the hydrogen content or concentration in the low pressure, low temperature stream of primary reactor coolant in the letdown line 18 or the subsequent main line 22 of the CVCS 14. This is also called the letdown sensor or 'H2 letdown'. In the shown example the measuring point is downstream the heat exchanger 20 and upstream the tee connection 30 to the VCT 24. For practical reasons, the measurement is preferably inbound into a bypass from the main flow. In other words, there is a short branch line 50 arranged in parallel flow configuration with respect to the main line 22, wherein the inlet 52 into the bypass and the outlet 54 are realized by tee connections, such that a branch flow of primary reactor coolant is diverted from the main flow and then re-united with it. The hydrogen sensor 48 is arranged either directly within said branch line 50 or in a secondary branch.

A second hydrogen sensor 56 is arranged for measuring the hydrogen content or concentration in the high-pressure part, but preferably low temperature stream of primary reactor coolant within the charging line 34, downstream the injection point of the hydrogenation system 16 (i.e. downstream the tee connection 42). This is also called the charging sensor or 'H2 charging'. In the shown example the measuring point is upstream the heat exchanger 20. Just like the first hydrogen sensor 48, the second hydrogen sensor 56 may be arranged in bypass of the main flow. That is, there may be a branch line 58 diverting from the charging line 34, such that the second hydrogen sensor 56 is arranged within said branch line 58 or in a secondary branch. As shown in FIG. 1, the branch line 58 may lead to the low-pressure section of the main line 22 or to the branch line 50 of the first hydrogen sensor 48, preferably discharging downstream the first hydrogen sensor 48. This way, a sampling backflow from the high-pressure section to the low-pressure section of the CVCS 14 is realized. A pressure reducing valve (not explicitly shown here) in the backflow line 60 compensates for the different pressure levels.

Figure 3:
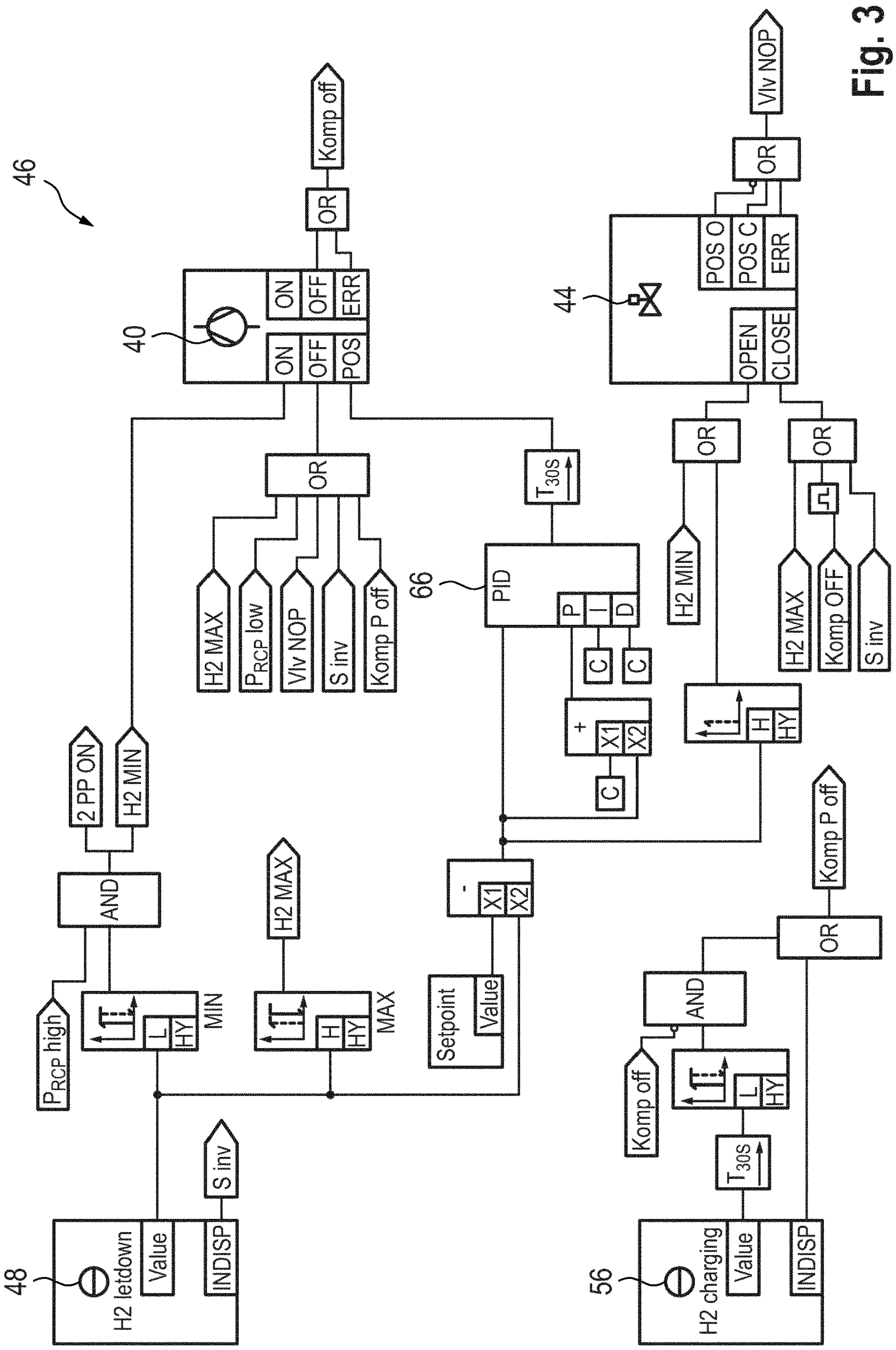
FIG. 3 shows a flowchart of according instrumentation and control functions.

Description of the I&C Functions and the Control Concept:

The Instrumentation and Control (I&C) concept visualized in FIG. 3 shows the simplified logic to be integrated for the control of the hydrogenation system 2. The equipment (in particular sensors, valves, compressors) may also be integrated in the plant's own I&C or may be supplied with a standalone black box I&C. The input for the concept comprises a H2 concentration setpoint and as many component feedback signals as requested by the plant operator. The I&C itself will be based on standard I&C components, thus it is easy to be implemented into any existing I&C structure. Additional components, for instance an electrolyzer as hydrogen source can also be implemented in the black box if requested.

Measurements:

As discussed above, there are preferably two hydrogen online measurements, one is connected to the letdown line 18 (including the subsequent main line 22) and one to the charging line 34. The letdown line measurement is located in the low pressure/temperature part of the CVCS 14 in order to facilitate the interface to the online measurement physically. The measurements will preferably be inbound into a bypass from the main flow. For availability reasons at each location in the charging line 34 and/or letdown line 18, the hydrogen sensors 48, 56 can be implemented two or three times with a simple voting logic providing e.g. a 1-out-of-2 or 2-out-of-3 signal.

Actuators:

As discussed above, there are essentially two actuators foreseen in the hydrogenation station design. A piston or membrane compressor 70 that is used as a feeding pump 40 to inject hydrogen into the main charging line 34 of the CVCS 14 and an isolation valve 44 downstream the compressor 70 that is dedicated to isolation functions for either normal operation cases or limitation functions. Based on the compressor technology, an additional control valve can be necessary or beneficial in the gas feeding line 38.

Control:

The control of the hydrogenation system 16 is based on the hydrogen measurement in the letdown line 18. The hydrogen concentration in the letdown line 18 is essentially the same as the one in the primary reactor coolant circuit 4, provided that the main primary pumps (i.e. Reactor Coolant Pumps 12) are in operation and the main primary reactor coolant circuit 4 is therefore in a homogenized condition.

The setpoint (labelled 'Setpoint' in the diagram) of the hydrogenation system 16 is set by the operator as constant value and together with the H2 concentration in the letdown line 18 (H2 letdown), the control deviation is derived by subtraction of the H2 concentration in the letdown line 18 from the setpoint (naturally the setpoint is the target value in the main primary circuit). The PID controller 66 regulates the reactivity of the control by a variable GAIN control based on the difference between the setpoint and the hydrogen concentration measured in the letdown line 18. The higher the deviation between the setpoint and the H2 concentration in the letdown line 18, the more reactive the controller will be due to the GAIN that is increased proportional to the deviation.

The (speed regulated) compressor 70 of the feeding pump 40 is adjusted via the PID controller 66. It is shut off on a couple of different signals, like the closed isolation valve 44, sensor errors, low Reactor Coolant Pump (RCP) pressure or H2 max signal. The isolation valve 44 is operated in a similar manner.

The signal from the PID controller 66 to the compressor 70 is delayed for the startup of the regulation compared to the signal opening the isolation valve 44. In order not to have a continuous active control loop, the isolation valve 44 is only opened in case of a defined minimum control deviation. If the regulation shows that this step is not necessary, the limit can be set to 0.

Limitations:

Basically, there is a 'MAX concentration reached' signal and a 'MIN concentration reached' signal, both are generated from the measured hydrogen concentration in the letdown line 18. In order to make the concept more robust in case parts of the CVCS 14 are not in operation, it is also possible to have an external signal from a nuclear sampling system.

The hydrogen sensor 48 in the letdown line 18 acts as an operational safety device in order to start up the hydrogenation in case of load follow operation or other types of perturbations of hydrogen concentration in the main primary system or hydrogenation shut down as soon as technical specified limits of concentration are reached.

The hydrogen sensor 56 in the charging line 34 is used in order to check the injection capability. If the concentration in the charging line 34 does not rise in a pre-defined time despite the compressor 70 operating, the compressor 70 is shut down (for example in case of feeding line isolation).

Figure 4:
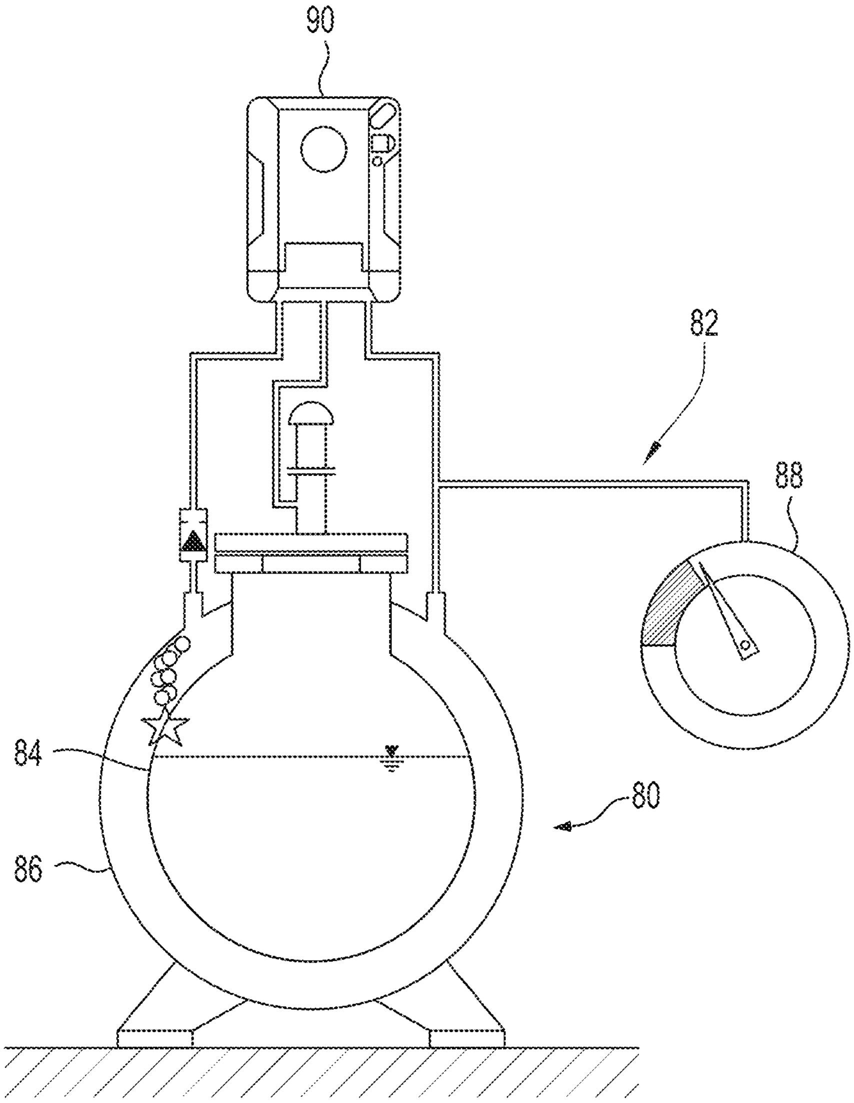
FIG. 4 shows a leakage sensing system on a double-walled pipe or tank for use in the system according to FIG. 2.

Operational Safety:

In order to deliver the necessary safety for the hydrogen containing piping, double walled pipes 80 with leakage monitoring system 82 will preferably be used for the feeding line 38, in particular its high-pressure section downstream the feeding pump 40. A schematic example is shown in FIG. 4. Under normal operating conditions the area (interspace) between the inner wall 84 and the outer wall 86 will be kept under vacuum with a small vacuum pump 90. In case of a leak of the inner wall 84 (or outer wall 86), involving a rise of pressure in the interspace to be detected by an according pressure gauge 88, an alarm will be triggered, allowing for automatic actions to isolate the pipe (hardwired signal of pressure gauge 88 and feeding pump is preferred). In case of such an alarm the automatic action would include the direct stop of the piston compressor 70 upstream, thus limiting the amount of hydrogen in the double walled pipe part.

LIST OF REFERENCE NUMERALS

2 Pressurized Water Reactor (PWR)
4 primary reactor coolant circuit
6 Reactor Pressure Vessel (RPV)
8 pressurizer
10 steam generator
12 Reactor Coolant Pump (RCP)
14 Reactor Chemical and Volume Control System (CVCS)
16 hydrogenation system
18 letdown line
20 heat exchanger
22 main line
24 Volume Control Tank (VCT)
26 fluid supply line
28 fluid discharge line
30 tee connection
32 charging pump
34 charging line
36 hydrogen supply
38 gas feeding line
40 feeding pump
42 tee connection
44 isolation valve
46 control system
48 hydrogen sensor
50 branch line
52 inlet
54 outlet
56 hydrogen sensor
58 branch line
60 backflow line
66 PID controller
70 compressor
80 double walled pipe
82 leakage monitoring system
84 inner wall
86 outer wall
88 pressure gauge
90 vacuum pump

What is claimed is:

1. A pressurized water reactor comprising:

a primary reactor coolant circuit flown through by a primary reactor coolant during operation; and a chemical and volume control system for the primary reactor coolant, the chemical and volume control system comprising, along the direction of flow of the primary reactor coolant, a letdown line, a pressure charging pump with a given discharge pressure, and a charging line leading to the primary reactor coolant circuit, the chemical and volume control system further comprising a hydrogenation system with a hydrogen supply and a hydrogen feeding line, a pressure feeding pump being arranged in the hydrogen feeding line to provide a gas pressure higher than the discharge pressure of the pressure charging pump, the hydrogen feeding line discharging into the charging line, a heat exchanger, configured to be flown through by a heating medium, being arranged in the charging line to increase the temperature of the primary reactor coolant before injection into the primary reactor coolant circuit, a connection between the hydrogen feeding line and the charging line being located in a section of the charging line between the charging pump and the heat exchanger.

2. The pressurized water reactor according to claim 1, wherein the feeding pump comprises a compressor.

3. The pressurized water reactor according to claim 2, wherein the compressor is a piston compressor or a membrane compressor.

4. The pressurized water reactor according to claim 1, wherein an isolation valve is arranged in a section of the feeding line between the feeding pump and a point of injection into the charging line.

5. The pressurized water reactor according to claim 4, wherein the hydrogen feeding line comprises a double walled pipe with an evacuated interspace between an inner wall and an outer wall, the chemical and volume control system including a leakage detection system configured to monitor pressure within the interspace.

6. The pressurized water reactor according to claim 4, further comprising a control system with a hydrogen sensor configured for measuring hydrogen contents of the primary reactor coolant in the charging line downstream the point of injection, and wherein the control system is configured to close the isolation valve when said measured hydrogen contents does not match the hydrogen feed rate of hydrogen provided by the hydrogenation system.

7. The pressurized water reactor according to claim 1, further comprising a control system with a hydrogen sensor which measures the hydrogen contents of the primary reactor coolant in the letdown line, wherein the control system is designed for controlling the hydrogen feed rate by setting the power of the feeding pump on the basis of a difference between said measured hydrogen contents and a given setpoint for said hydrogen contents.

8. A method of operating a pressurized water reactor, the pressurized water reactor comprising a primary reactor coolant circuit flown through by a primary reactor coolant during operation, the pressurized water reactor comprising a chemical and volume control system for the primary reactor coolant, the chemical and volume control system comprising, along the direction of flow of the primary reactor coolant, a letdown line, a pressure charging pump with a given discharge pressure, and a charging line leading to primary reactor coolant circuit, the chemical and volume control system further comprising a hydrogenation system with a hydrogen supply and a hydrogen feeding line, a pressure feeding pump being arranged in the hydrogen feeding line to provide a gas pressure higher than the discharge pressure of the pressure charging pump, the hydrogen feeding line discharging into the charging line, a heat exchanger, configured to be flown through by a heating medium, is arranged in the charging line to increase the temperature of the primary reactor coolant before injection into the primary reactor coolant circuit, a connection between the hydrogen feeding line and the charging line being located in a section of the charging line between the charging pump and the heat exchanger, the method comprising:

pressurizing hydrogen in the hydrogen feeding line to a pressure higher than the discharge pressure of the charging pump;

and then injecting the pressurized hydrogen into the primary reactor coolant via the charging line.

* * * * *